United States Patent
Hsu

(10) Patent No.: US 7,881,077 B2
(45) Date of Patent: Feb. 1, 2011

(54) PWM CONTROLLER WITH OUTPUT CURRENT LIMITATION

(75) Inventor: Ta-Ching Hsu, Taipei County (TW)

(73) Assignee: Niko Semiconductor Co., Ltd., Taipei County (TW)

( * ) Notice: Subject to any disclaimer, the term of this patent is extended or adjusted under 35 U.S.C. 154(b) by 712 days.

(21) Appl. No.: 11/780,761

(22) Filed: Jul. 20, 2007

(65) Prior Publication Data

US 2009/0021233 A1  Jan. 22, 2009

(51) Int. Cl.
*H02M 3/335* (2006.01)
(52) U.S. Cl. .................. 363/21.12; 363/18; 363/19; 363/21.15
(58) Field of Classification Search ............ 363/21.12, 363/21.13, 17, 18, 19, 20.01, 21.09, 21.1, 363/21.15, 21.17, 21.18, 49
See application file for complete search history.

(56) References Cited

U.S. PATENT DOCUMENTS

| | | | |
|---|---|---|---|
| 5,499,184 A * | 3/1996 | Squibb | 363/100 |
| 7,133,300 B1 * | 11/2006 | Yang | 363/56.11 |
| 7,149,098 B1 * | 12/2006 | Chen | 363/56.09 |
| 2006/0256588 A1 * | 11/2006 | Chen | 363/55 |

* cited by examiner

*Primary Examiner*—Bao Q Vu
*Assistant Examiner*—Nguyen Tran
(74) *Attorney, Agent, or Firm*—Rosenberg, Klein & Lee

(57) ABSTRACT

A PWM controller with output current limitation makes the over-current limitations almost the same even though the input voltages are different. The designer does not need to use high specification components or add an output current limiting circuit against the over-current condition. Costs are reduced and the layout is simplified. The switch power supply includes a transformer, a power switch, a first detecting circuit for generating a first detecting signal, a second detecting circuit for generating a second detecting signal, and a controller. The transformer converts the power and outputs the power to the secondary side. The power switch has a first terminal, a second terminal, and a controlled terminal. The controller has a control terminal, a first detecting terminal for receiving the first detecting signal, and a second detecting terminal for receiving the second detecting signal. The controller performs a protecting operation according to the received signals.

11 Claims, 6 Drawing Sheets

PWM CONTROLLER WITH OUTPUT CURRENT LIMITATION

BACKGROUND OF THE INVENTION

1. Field of the Invention

The present invention relates to a PWM controller with output current limitation. Its over-current limitations are almost the same even though the input voltages are different. The cost of the power supply circuit is reduced and the layout of the PCB is simplified.

2. Description of the Related Art

FIG. 1 shows a flyback power supply. When the power is turned on, the input power VIN provides a small current to charge the capacitor C2 via the resistor R1. When the voltage of the capacitor C2 reaches the operating voltage VH (this means that the voltage of VCC pin reaches the operating voltage VH), the UVLO (Undervoltage Lockout) comparator outputs a low level signal to release the oscillating circuit 20. At this time, the oscillating circuit 20 outputs a pulse signal to the input terminal S of the SR flip-flop 25. After the SR flip-flop 25 receives the pulse signal from the oscillating circuit 20, it outputs a high level pulse signal to the driving circuit 70. The driving circuit 70 connects to the gate of the power transistor Q1 and turns on the power transistor Q1. The primary current from the input power VIN flows forward to the primary side of the transformer T1, the power transistor Q1 and the current detecting resistor R2. Next, the current flows back to the negative terminal of the input power VIN (the grounding terminal of the system). When the current detecting voltage generated by flowing the primary current through the resistor R2 is larger than the reference voltage provided by the voltage divider 35, the cycle control comparator 40 outputs a high level reset signal to the input terminal R of the SR flip-flop 25. At this time, the output of the driving circuit 70 becomes a low level to turn off the power transistor Q1.

During the turning on period of the power transistor Q1, the power cannot be delivered to the output terminal VO and the power is stored in the transformer T1 due to fact that the polarities of the secondary side winding of the transformer T1 and the rectifying diode are different. After the power transistor Q1 turns off, the polarities of the windings of the transformer T1 are inversed. At this time, the polarities of the secondary side winding and the rectifying diode are the same and the power stored in the transformer T1 is released to the output terminal VO for providing the current to the loading connected with the output terminal VO and the output capacitor C3. After the power stored in the transistor T1 is fully released, the current flowing through the rectifying diode D2 from the secondary side winding is cut off. The voltage stored in the output capacitor C3 is released to provide the required current to the output terminal VO.

Next, the power transistor Q1 remains in the turned-off status until the oscillating circuit 20 outputs a next pulse signal to the input terminal S of the SR flip-flop 25 to turn on the power transistor Q1. The above steps are repeated. The output voltage VO becomes higher and higher and the photo coupler PH1 generates a voltage detecting current, and so the voltage outputted to the non-inverting input terminal of the comparator 40 from the voltage divider 35 lowers. Therefore, the maximum turn-on current for each cycle (the current detecting signal generated by the resistor R2 and flowing to the inverting input terminal of the comparator 40) lowers to reduce the power delivered to the output terminal VO. When the stored power $\frac{1}{2}LI^2$ (L is the inductance of the transformer, I is the maximum turn-on current for each cycle) in the primary side of the transformer T1 is equal to the required power for the loading, the circuit becomes stable. Thereby, the output voltage is stable due to the above feedback control processes.

The flyback power supply of the prior art does not have input compensating and current limiting functions. It merely uses a current detecting resistor R2 to protect the circuit. When an overload occurs, the over-current is outputted, as shown in FIG. 2. In FIG. 2, point B is the maximum rating output power in the specification. The protection point C is the maximum output power Pmax in a real circuit, slightly larger than the maximum rating output power. When the required power of the loading exceeds the power of the point C (such as the loading being shorted, or a user accidentally touching the secondary side of the transformer T1), the output voltage Vo of the secondary side lowers and the output current Io rises due to the output power (Pmax=Vo*Io) being at its maximum so that it cannot increase any further. The ratio between the output voltage Vo and the voltage of the VCC pin, equal to the ratio between the coils of the secondary winding and the auxiliary winding), is constant. Therefore, the output voltage Vo lowers and the voltage of the VCC pin also lowers. When the voltage of the VCC pin is lower than a voltage VL, such as the current returning point D in FIG. 2, the oscillating circuit 20 stops outputting the pulse signal, and the power supply enters in a protection status to stop outputting power. When the input power VIN is low, the over-loading path is CDG (for example, the input power VIN is provided from AC 90V.). When the input power VIN is high (for example, the input power VIN is provided from AC 264V.), the over-loading path is EFG due to the maximum output power Pmax being higher than the input power VIN.

As described above, when an overload occurs, the output current Io is substantially increased and then becomes zero. The outputted current is larger than the current in the specification of devices. Therefore, the current specification of devices, such as the transformer T1, the output diode D2, and the output capacitor C3, must be increased so that the cost of the power supply increases.

SUMMARY OF THE INVENTION

One particular aspect of the present invention is to provide a PWM controller with output current limitation. Its over-current limitations are almost the same even though the input voltages are different. High specification components against the over-current problem are not necessary in the present invention. The circuit cost of the power supply is reduced and the layout of the PCB is simplified.

The present invention provides a switch power supply. The switch power supply includes a transformer, a power switch, a first detecting circuit, a second detecting circuit, a compensating device and a controller. The transformer has a primary side and a secondary side for converting the power received by the primary side and outputting to the secondary side. The power switch has a first terminal, a second terminal, and a controlled terminal. The first terminal is coupled with the primary side of the transformer, the second terminal is coupled with grounding, and the controlled terminal is coupled with a control terminal. The first detecting circuit is coupled between the power switch and the grounding for generating a first detecting signal. The second detecting circuit is coupled with the secondary side of the transformer for generating a second detecting signal. The controller has a control terminal, a first detecting terminal, and a second detecting terminal. The compensating device is coupled between the first detecting circuit and the second detecting circuit for compensating the second detecting signal with the first detecting signal. The control terminal is coupled with the controlled terminal of the power switch. The first detecting terminal is coupled with the first detecting circuit for receiving the first detecting signal. The second detecting terminal is coupled with the second detecting circuit for receiving the second detecting signal. The controller performs a protecting operation according to the signal received by the second detecting terminal.

The present invention also provides a controller for controlling a switching power supply. The controller includes an oscillating circuit, a first judging unit, a second judging unit, and a logic control circuit unit. The oscillating circuit is used for generating a pulse signal. The first judging unit receives a first detecting signal to generate a cut-off signal. The second judging unit receives a second detecting signal to generate an over-current protecting signal. The logic control circuit unit receives the pulse signal, the cut-off signal and the over-current protecting signal and generates a logic control signal according to the pulse signal, the cut-off signal and the over-current protecting signal to control the operation of the switch power supply.

The present invention utilizes a compensating method to make the over-current compensations for different input voltages be the same. Thereby, the output current limitations for different input voltages are almost the same.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

The present invention utilizes the characteristic of the levels of the current detecting signals on the primary side of the transformer being different when the input voltages are different. It couples the current detecting signal to the feedback signal of the detecting circuit at the output terminal to compensate for the feedback signal. Thereby, the output current limitations for different input voltages are almost the same.

Figure 1:
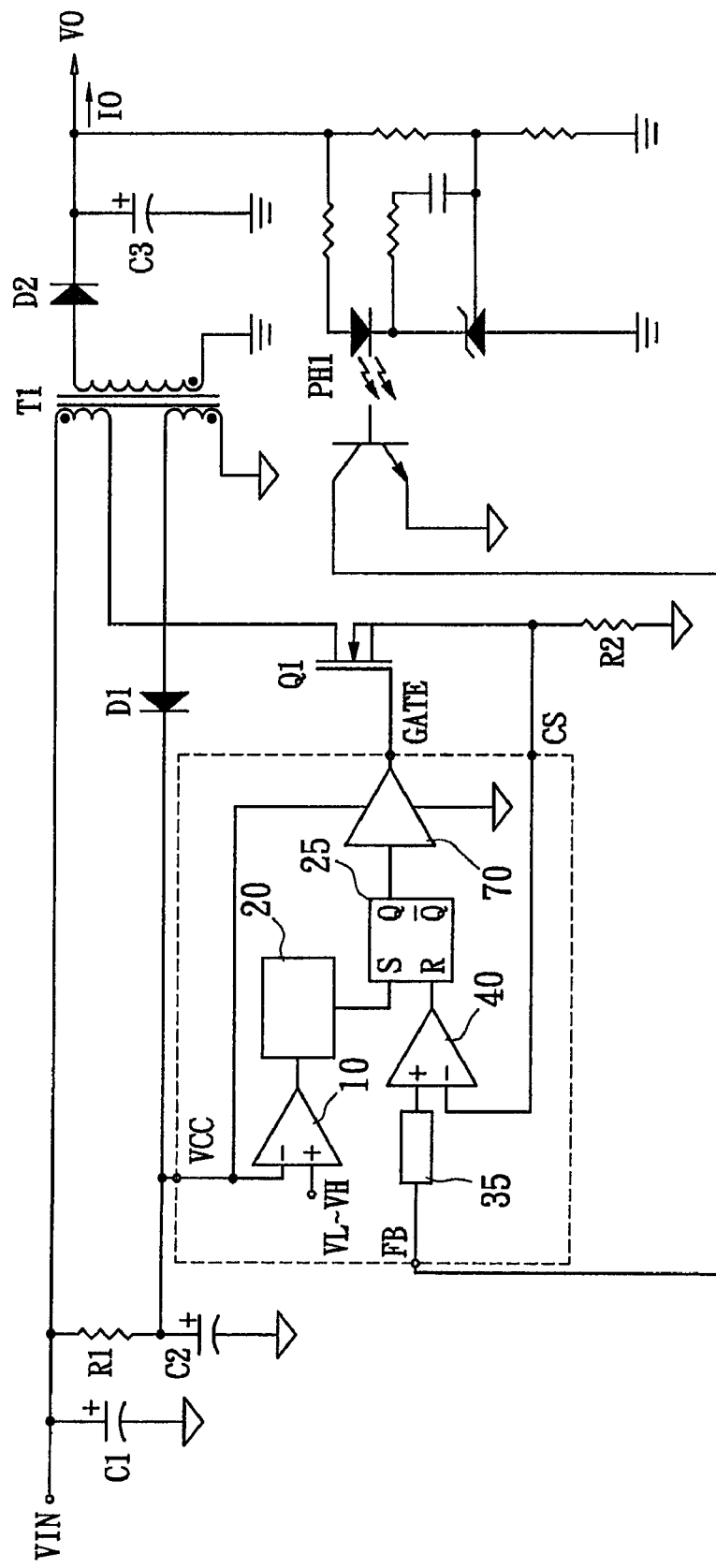
FIG. 1 is a schematic diagram of the flyback power supply of the prior art.
Figure 2:
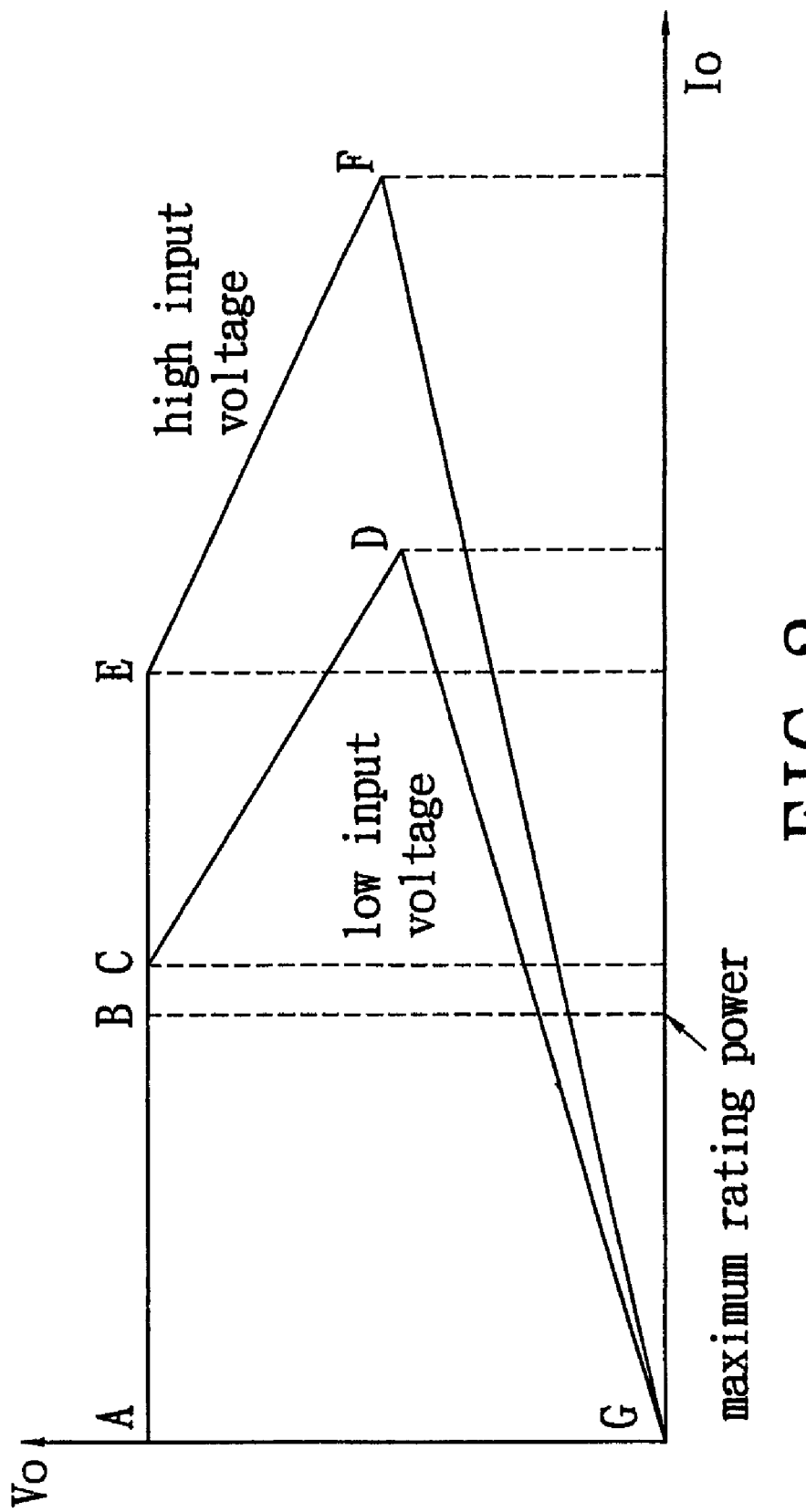
FIG. 2 is a curve diagram of the output voltage vs. the output current without a compensation of the prior art.
Figure 3:
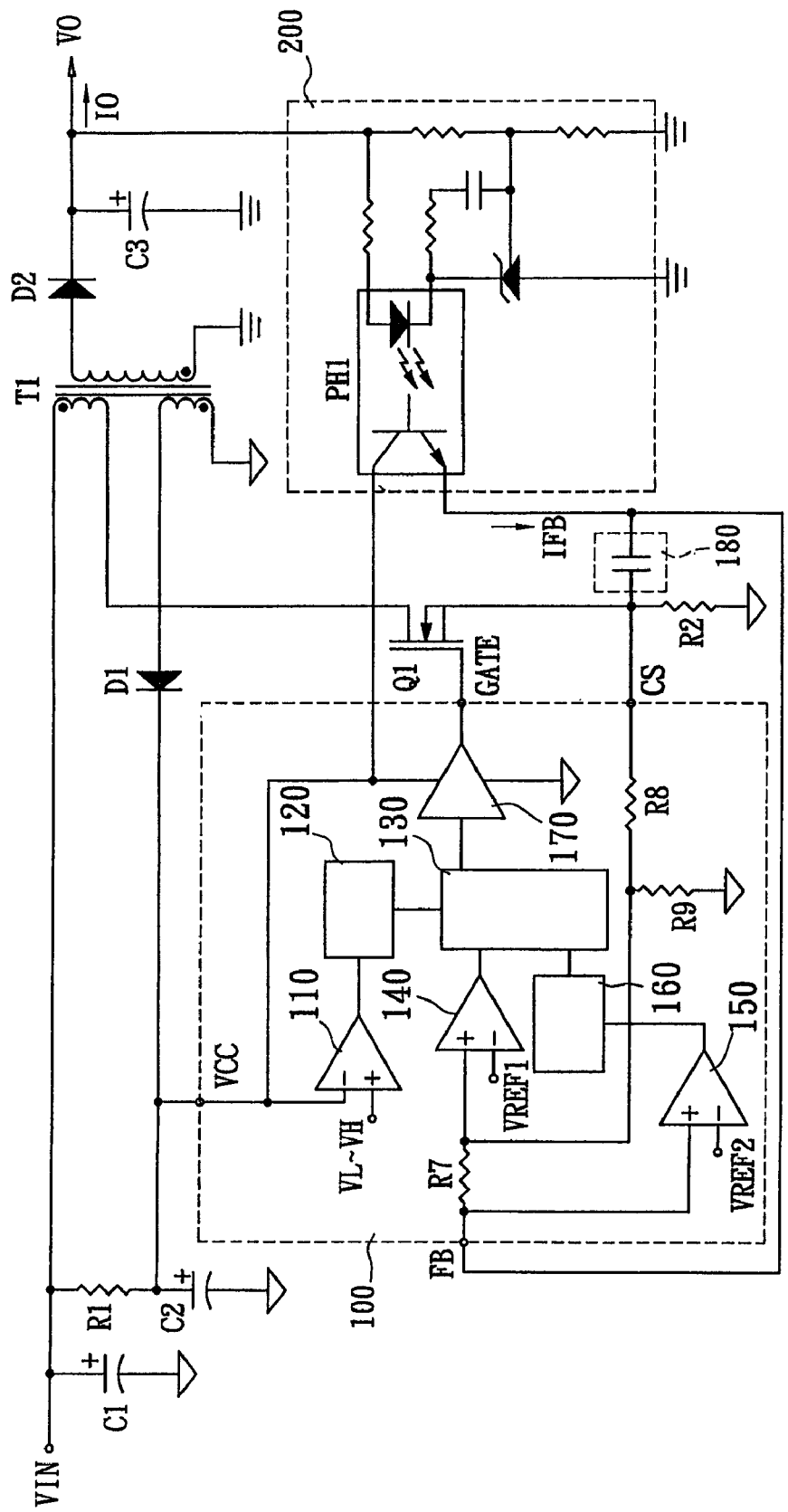
FIG. 3 is a schematic diagram of the switch power supply of the present invention.

FIG. 3 shows a schematic diagram of the switch power supply of the present invention. The switch power supply includes a controller 100, a power switch Q1, a current detector R2, a transformer T1, an output detector 200, and a compensating device 180. The current detector R2 detects the current flowing through the primary side of the transformer T1 and generates a current detecting signal to the current detecting signal terminal CS of the controller 100. The output detector 200 detects the voltage of the primary side of the transformer T1 and generates a voltage detecting signal to the voltage feedback terminal FB of the controller 100. In this embodiment, the switch power supply is a flyback power supply. It also can be a forward power supply, a push-pull power supply, a half-bridge power supply, or a full-bridge power supply. The power switch Q1 is a NMOS transistor. It also can be a PMOS transistor, a FET, a BJT, an IGBT, etc. The controller 100 controls the power switch Q1 to be turned on or off according to the current detecting signal and the voltage detecting signal. The controller 100 includes an under voltage lockout circuit (UVLO) 110, an oscillating circuit unit 120, a logic control circuit unit 130, a turned-on period control comparator 140, an over-current comparator 150, a time-delay circuit 160, and a driving circuit 170. The operation of the controller 100 is illustrated as below.

When the input power VIN provides electrical power, the capacitor C2 is charged via the resistor R1 to provide a voltage to the VCC pin of the controller 100. When the voltage of the capacitor C2 exceeds a first pre-determined voltage VH, the signal of the under voltage lockout circuit 110 becomes a low level from a high level to make the oscillating circuit unit 120 output the pulse signal. Thereby, the system starts to work. The controller 100 includes the under voltage lockout circuit 110 to ensure the voltage of the VCC pin has an adequate voltage to prevent the circuit from working abnormally and being damaged.

In a normal condition, after the oscillating circuit unit 120 generates the pulse signal to the logic control circuit unit 130, the logic control circuit unit 130 receives the pulse signal and outputs a high level pulse signal to the driving circuit 170. Next, the driving circuit 170 outputs the driving signal to the gate of the power switch Q1 to turn on the power switch Q1. The current provided by the input power VIN flows through the transformer T1, the power switch Q1 and the current detector R2. Next, the current flows back to the negative terminal of the input power VIN (the grounding terminal of the primary side). At this time, the power on the primary side cannot be delivered to the output terminal VO and the capacitor C2, and the power is stored in the transformer T1 due to the polarities of the output winding of the transformer T1 and the output diode D1 being different. When the voltage at the current detecting signal terminal CS is higher than a pre-determined voltage, i.e. the voltage of the non-inverting input terminal of the turned-on period control comparator 140 is higher than the reference voltage VREF1 of the inverting input terminal, the turned-on period control comparator 140 outputs a cut-off signal to the logic control circuit unit 130 to make the driving circuit 170 turn off the power switch Q1. At the next cycle, the oscillating circuit unit 120 generates the pulse signal to the logic control circuit unit 130 again. The logic control circuit unit 130 receives the pulse signal and outputs a high level pulse signal to the driving circuit 170. Next, the driving circuit 170 outputs the driving signal to the gate of the power switch Q1 to turn on the power switch Q1. The steps are repeated so that the system is kept stable.

The voltage feedback terminal FB is coupled with the output detector 200. In this embodiment, the output detector 200 includes a photo coupler PH1. A current signal IFB is generated on the primary side of the photo coupler PH1, flows through the resistors R7, R9 and R8, the compensating device C5, and the current detector R2, to generate a direct current signal. The inductor current on the primary side flows through the power switch Q1, the current detector R2 and the compensating device 180, and generates a sawtooth signal when the power switch Q1 is turned on. Because the direct current signal is added with the sawtooth signal, a sawtooth voltage signal with a DC component is inputted to the non-inverting input terminal of the turned-on period control comparator 140. When the peak of the sawtooth voltage signal is higher than the first reference voltage VREF1 inputted to the inverting input terminal of the turned-on period control comparator 140, a cut-off signal is generated and is outputted to the logic control circuit unit 170 and makes the driving circuit turn off the power switch Q1.

Because the increasing rate of the current on the primary side of the transistor T1 is proportional to the magnitude of the input voltage VIN (VIN/L, L is the inductance of the transistor T1), the operating period of the power switch Q1 is small when the input voltage VIN is high. Inversely, the operating period of the power switch Q1 is longer when the input voltage VIN is low. This means that the sawtooth voltage signal inputted to the non-inverting input terminal of the turned-on period control comparator 140 has a larger DC component when the input voltage VIN is high, and has a smaller DC component when the input voltage VIN is low.

Figure 5:
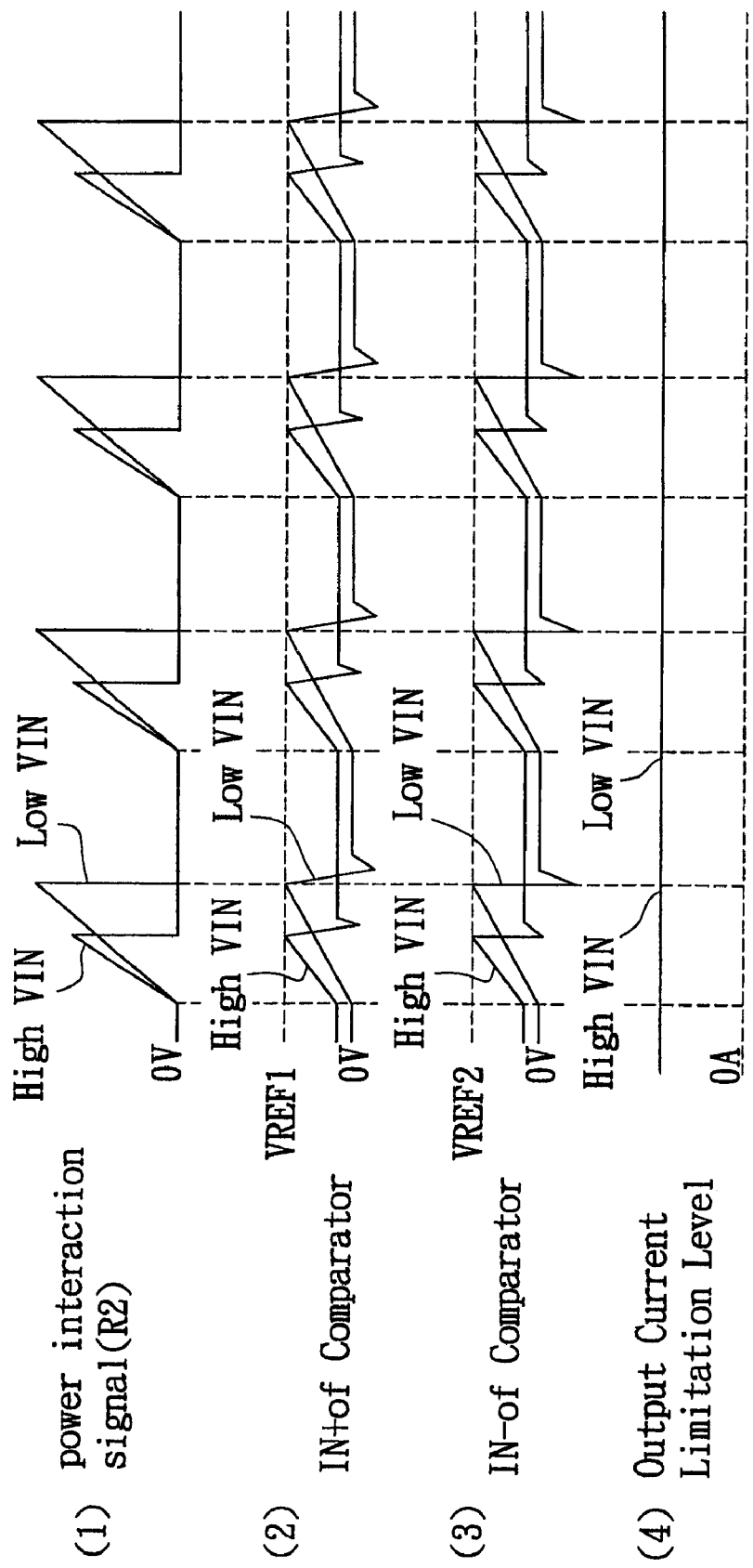
FIG. 5 is a waveform diagram of the present invention operating at the output current-limit point.

Reference is made to FIG. 5(1). Compared to the higher input voltage VIN, the signal, inputted to the non-inverting input terminal of the comparator 140, has a lower DC component and a higher sawtooth waveform component and so its duty cycle is longer when the input voltage VIN is lower . Reference is made to FIG. 5(3). The sawtooth voltage signal generated at the non-inverting input terminal of the turned-on period control comparator 140 has a larger DC component when the input voltage VIN is high, and has a smaller DC component when the input voltage VIN is low. In this embodiment, because the compensating device 180 is a capacitor C5, the voltage difference between the voltage of the current detector R2 and the voltage of the photo coupler PH1 is stored thereon when the power switch Q1 is turned on. Therefore, the voltage on the capacitor when a high input voltage VIN inputted is smaller than the voltage on the capacitor when a low input voltage VIN inputted. Therefore, referring to FIG. 5(3), when the low input voltage VIN inputted, the turn-on duty of the power switch Q1 is larger due to dc component is lower and the current of increasing rate is smoother, when the high input voltage VIN inputted, the turn-on duty of the power switch Q1 is changed smaller due to dc component is higher and the current of increasing rate is sharper. Of course, the compensating device C5 is not restricted to a capacitor, a resistor, or other such coupling components. Any device that can couple the voltage or the current detecting signal of the secondary side with the current detecting signal of the primary side is within the scope of the present invention. FIG. 5(4) shows a voltage waveform at the inverting input terminal of the over-current comparator 150 when the input voltage is high and low. Because it is similar to the FIG. 5(3), the illustration is not repeated again.

The present invention uses the current detector R2, the compensating device C5, the photo coupler PH1 and the over-current comparator 150 to form the output current limitation control circuit. Voltages at the voltage feedback terminal FB generated by the current signal of the photo coupler PH1 are different when the input voltages are different. The compensating device C5 couples the voltage signal of the current detecting resistor therewith at the voltage feedback terminal FB, and thereby the peak voltage received by the voltage feedback terminal FB has the same protection level of over-current. As shown in FIG. 5(4), the output current limitations of the present invention are almost the same even though the input voltages are different. When the loading exceeds the output current limitation, the power switch Q1 is turned off and the power voltage VCC is decreased, so that the output current becomes zero. Of course, in order to avoid the error-action caused by noise or an interference, the time-delay circuit 160 cannot periodically receive the comparing signal from the over-current comparator 150 when the current is over, and enters in a time-counting status. When the counted time is longer than a pre-determined period (or pre-determined cycles), the time-delay circuit 160 outputs a protecting signal to make the controller 100 enter a protecting status.

Figure 4:
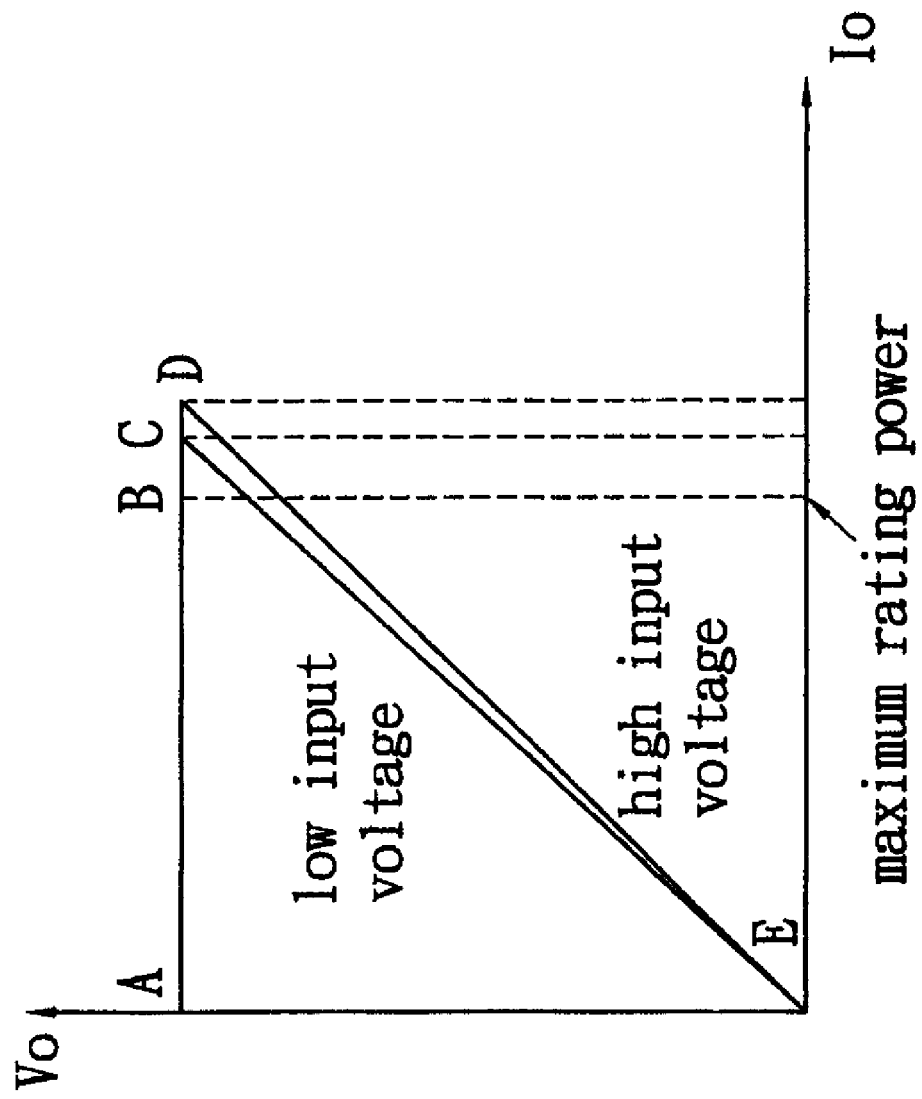
FIG. 4 is a curve diagram of the output voltage vs. the output current of the present invention.

FIG. 4 is a curve diagram of the output voltage vs. the output current of the present invention. Curve A-B-C-E is the operating characteristic curve when the input voltage is low. Curve A-B-D-E is the operating characteristic curve when the input voltage is high. C is the power limitation point and the current returning point when the input voltage is low. D is the power limitation point and the current returning point when the input voltage is high. The point C is close to the point D. This means that the over-current protection levels for the high input voltage and the low input are compensated to almost the same. When the output current exceeds the power limitation point, the output current becomes zero.

The compensating device makes the power limitation points almost the same even though the input voltages are different. Alternatively, without the compensating device, the power limitation points for different input voltages of the present invention are still better than those of the prior art. Therefore, the compensating device is not a necessary element, and depends on the user's requirement.

Figure 6:
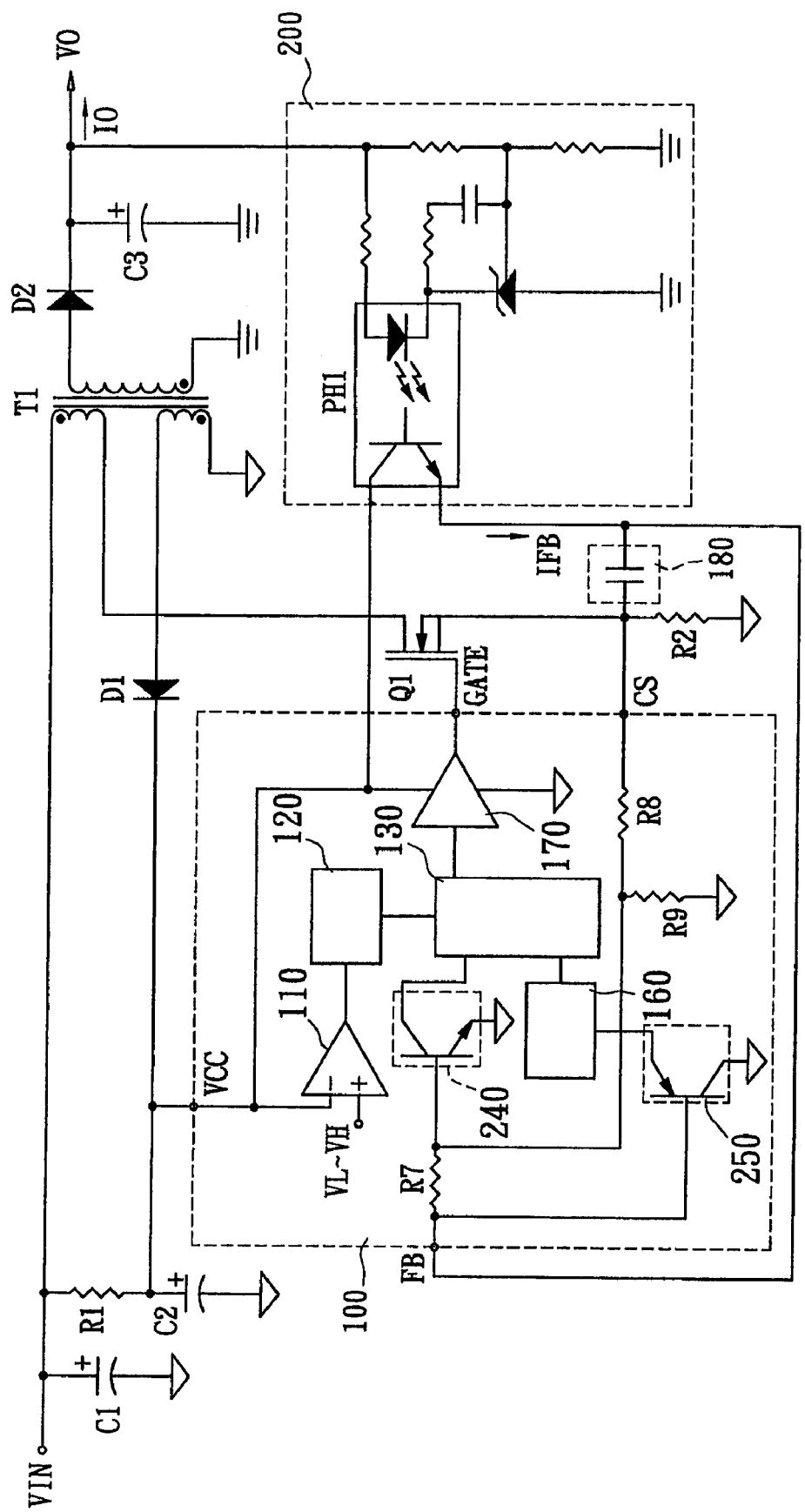
FIG. 6 is a schematic diagram of the switch power supply of the second embodiment of the present invention.

FIG. 6 is a schematic diagram of the switch power supply of the second embodiment of the present invention. The controller 100 includes a under voltage lockout circuit (UVLO) 110, an oscillating circuit unit 120, a logic control circuit unit 130, a first judging unit 240, a second judging unit 250, a time-delay circuit 160, and a driving circuit 170. The difference between FIG. 6 and FIG. 3 is that the turned-on period control comparator 140 and the over-current comparator 150 are replaced by the first judging unit 240 and the second judging unit 250. The first judging unit 240 judges the signal level of the current detecting signal terminal CS to determine the turned-on period of the output signal. The second judging unit 250 judges the voltage of the voltage feedback terminal FB to determine whether a protecting signal is generated or not. In this embodiment, the first judging unit 240 can be an NPN BJT and the second judging unit 250 can be a PNP BJT. Alternatively, the first judging unit 240 can be a PNP BJT and the second judging unit 250 can be an NPN BJT, or other judging elements.

By using the compensating device 180, the signal of the voltage feedback terminal FB includes a DC component (provided by the voltage detecting signal) and a sawtooth signal component (provided by the current detecting signal). The output signal level of the emitter of the PNP BJT 250 changes as the signal of the voltage feedback terminal FB changes. When the signal level of the voltage feedback terminal FB is larger than a pre-determined level, it means the system is operating normally. When the signal level of the voltage feedback terminal FB is smaller than the pre-determined level, it means the system is operating abnormally. In other words, when the output current is too high, the second judging unit 250 outputs a high level over-current protecting signal. When the time-delay circuit 160 continuously receives the over-current protecting signal for a pre-determined period, the time-delay circuit 160 outputs a protecting signal to make the controller 100 enter a protecting status, and prevents the over-current from continuously occurring.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A controller for controlling a switching power supply, comprising:
   an oscillating circuit for generating a pulse signal;
   a first judging unit for receiving a first detecting signal to generate a cut-off signal;
   a second judging unit for receiving a second detecting signal to generate an over-current protecting signal;
   a logic control circuit unit for receiving the pulse signal, the cut-off signal and the over-current protecting signal, and accordingly generating a logic control signal to control the operation of the switching power supply; and
   a compensation device for receiving the first detecting signal and the second detecting signal, and compensating the second detecting signal with the first detecting signal.

2. The controller as claimed in claim 1, wherein the first judging unit includes a BJT.

3. The controller as claimed in claim 1, wherein the second judging unit includes a BJT.

4. The controller as claimed in claim 1, wherein the first judging unit is a comparator for comparing the first detecting signal and a first reference voltage to generate the cut-off signal.

5. The controller as claimed in claim 1, wherein the second judging unit is a comparator for comparing the second detecting signal and a second reference voltage to generate the over-current protecting signal.

6. The controller as claimed in claim 1, further comprising a time-delay unit coupled between the second judging unit and the logic control circuit unit, for transmitting the over-current protecting signal to the logic control circuit unit when the over-current protecting signal continuously occurs over a pre-determined period.

7. The controller as claimed in claim 1, further comprising a gate driving circuit for receiving the logic control signal to generate a control signal to control the switching power supply.

8. The controller as claimed in claim 1, wherein the compensating device includes a capacitor.

9. The controller as claimed in claim 1, wherein the second detecting signal is generated by a photo coupler.

10. The controller as claimed in claim 1, wherein the compensated second signal includes a DC component, and a sawtooth signal component.

11. The controller as claimed in claim 1, wherein the compensating device includes a resistor.

* * * * *